United States Patent
Chen et al.

(10) Patent No.: US 6,513,940 B1
(45) Date of Patent: Feb. 4, 2003

(54) FIELD-OF-VIEW SWITCHING AND FOCUSING SYSTEM OF COMMON-OPTICAL-PATH PERISCOPE

(75) Inventors: Ping-Ho Chen, Hsinchu (TW); Chin-Kun Lou, Hsinchu Hsien (TW); Jiun-Woei Huang, Taipei (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/072,268

(22) Filed: Feb. 7, 2002

(51) Int. Cl.[7] .................................................. G02B 5/10
(52) U.S. Cl. ...................... 359/858; 359/850; 359/872; 359/873; 359/877
(58) Field of Search ................................ 359/858, 850, 359/872, 873, 877, 835, 402, 403, 405; 250/201, 204, 208, 209

(56) References Cited

U.S. PATENT DOCUMENTS

| | | | | |
|---|---|---|---|---|
| 3,853,407 A | * | 12/1974 | Dewey, Jr. ................. | 356/320 |
| 3,857,632 A | * | 12/1974 | Yamashita et al. ........... | 359/512 |
| 4,051,534 A | * | 9/1977 | Dulich et al. ............. | 348/211.4 |
| 4,093,365 A | * | 6/1978 | Isono ....................... | 352/140 |
| 4,207,461 A | * | 6/1980 | Wilwerding .............. | 250/201.8 |
| 4,787,725 A | * | 11/1988 | Preussner et al. ........... | 359/401 |
| 4,912,388 A | * | 3/1990 | Tanaka et al. .............. | 318/640 |
| 5,112,329 A | * | 5/1992 | Storz ........................... | 606/46 |
| 5,134,519 A | * | 7/1992 | Abele et al. ................ | 359/405 |

* cited by examiner

*Primary Examiner*—Mohammad Sikder
(74) *Attorney, Agent, or Firm*—J. C. Patents

(57) ABSTRACT

A field-of-view switching and focusing system of a common-optical-path periscope, having an aspherical reflecting mirror system, a field-of-view driving system and a focus driving system. The field-of-view driving system and the focus driving system are located at two sides of the aspherical reflecting mirror system. The field-of-view driving system allows the aspherical reflecting mirror system to rotate, thereby, different curved faces of the aspherical reflecting mirror can reflect the incident light, so that the field of view can be switched. Further, by a linear movement of the aspherical reflecting mirror system driven along the optical path by the focus driving system, the focus fine adjustment is performed.

11 Claims, 3 Drawing Sheets

FIELD-OF-VIEW SWITCHING AND FOCUSING SYSTEM OF COMMON-OPTICAL-PATH PERISCOPE

BACKGROUND OF THE INVENTION

1. Field of the Invention

The invention relates in general to a common-optical-path periscope, and more particularly, to a field-of-view driving structure and a focus driving structure of common-optical-path periscopes.

2. Description of the Related Art

The periscope used in the conventional armored vehicle is normally mounted on a turret, such that both the periscope and the bore of the artillery are driven by the turret. The typical periscope has a wide field-of-view and narrow field-of-angle output modes. By switching between these two output modes and performing a focusing operation, the output image is optimized. In the prior art, driving components for switching field of view and focusing can be designed in a whole single member, or in separate driving members. The single member design uses a 90° rocker arm to change another set of lenses, so as to achieve the objective of switching field of view. The driving design for focusing includes rotating a guide bar by a motor, and driving a ring gear by the guide bar. The set of lenses is then adjusted by the displacement of the ring gear to achieve the objective of focusing.

Therefore, new-model periscopes usually have various kinds of optical output modes. For example, the periscope can be applied to extract different output modes of a visible charge-coupled device (CCD), a TTS and a LRF, optical sensing device in different wavelength bands, or the like. This common-optical-path periscope is a new type of periscope, in which different wavelength bands share the same common-optical-path before entering beam splitters.

However, the conventional field-of-view switching and focusing system, no matter the design integrating functions in one single member or with two functions in separate members, cannot be applied to the common-optical-path periscope.

SUMMARY OF THE INVENTION

The invention provides a switching field-of-view and coaxial focusing system suitable for using in a common-optical-path periscope that can perform fine focusing right after switching field of view.

The switching field-of-view and focus driving system of the common-optical-path periscope includes an aspherical reflecting mirror system, a field-of-view driving system and a focus driving system.

The aspherical reflecting mirror comprises a lens base, a lens frame, multiple resilient members, and multiple aspherical reflecting mirrors. The aspherical reflecting mirrors are mounted on the mirror frame, and the resilient member is used to suspend the mirror frame with respect to the mirror base. In addition, the mirror frame has a recess touched to the focusing driving system.

The field-of-view driving system is disposed at one side of the aspherical reflecting mirror system. Such field-of-view driving system is used to rotate the aspherical reflecting mirror system, such that one of the aspherical reflecting mirrors of the aspherical reflecting mirror system is facing the incident light. Using the field-of-view driving system to rotate the aspherical reflecting mirror system, different aspherical reflecting mirrors can individually face the incident light to achieve the objective of switching field of view.

The focus driving system is located at the other side of the aspherical reflecting mirror system to drive the aspherical reflecting mirror system moving along the optical path for fine adjustment of focus.

The field-of-view driving system includes a field-of-view driving motor, a first shaft, a worm gear and a shaft. The worm gear is driven to rotate by the first shaft, while the first shaft is driven to rotate by the driving motor. In addition, a second shaft is connected to the mirror base of the aspherical reflecting mirror system to rotate the mirror base.

The field-of-view of invention further comprises a first bearing and a first limit switch. The first bearing is fitted in the shaft, and the first limit switch is used to control the on/off state of the field-of-view driving motor.

The focus driving system comprises a focus driving motor, a third shaft, a worm gear, a lead screw, a slide, a limit pin, and a taper cam. The third shaft is driven by the focus driving motor to rotate. The worm gear is driven by the third shaft to rotate. The lead screw is driven by the worm gear to rotate, and the slide is driven to linearly move by the lead screw. The limit pin is disposed on the slide and move with the slide. The taper cam has one end in contact with the slide, and the other end in contact with the recess. The taper cam is rotated by the linear movement of the slide.

The focus driving system further comprises a bushing to enclose the slide of the focus driving system, the limit pin, the taper cam therein. The lead screw of the focus driving system sets inside the bushing, and the other end of the bushing attaches to the mirror base.

In addition, the bushing has a second limit switch therein, which combines with the limit pin to control the on/off state of the focus driving motor. The bushing further comprises a second resilient member with one end connected to an internal of the bushing, and the other end connected to the taper cam.

The focus driving system further comprises a second bearing fitted at a joint between the bushing and the lead screw.

The resilient members of the field-of-view and focusing system of the common-optical-path periscope include a spring.

Both the foregoing general description and the following detailed description are exemplary and explanatory only and are not restrictive of the invention, as claimed.

DESCRIPTION OF THE PREFERRED EMBODIMENTS

Figure 1:
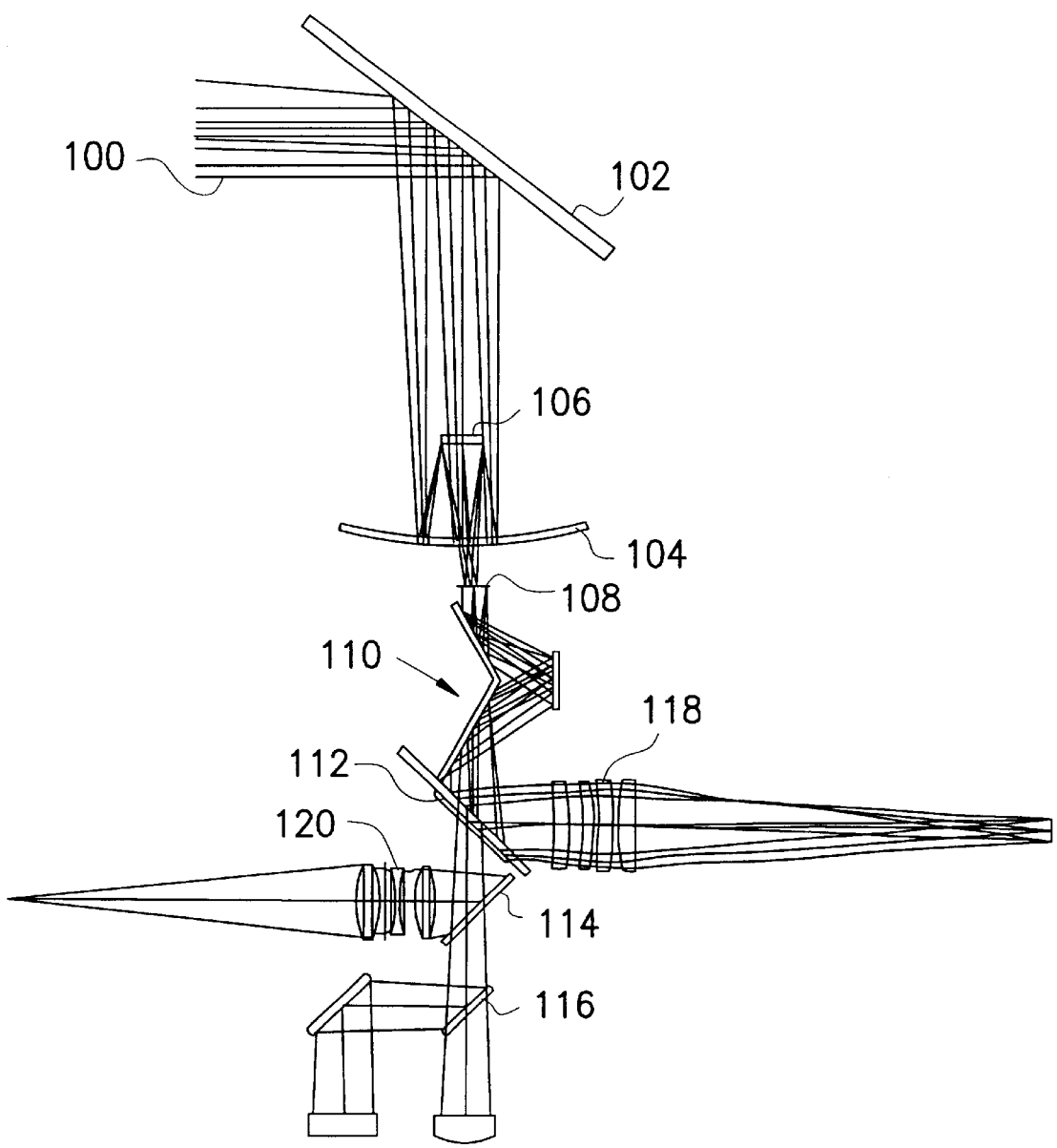
FIG. 1 optical path design of a common-optical-path periscope according to the invention.

Referring to FIG. 1, an optical path of a common-optical-path periscope in one embodiment of the invention is shown. The incident light 100 enters the common-optical-path periscope at the head mirror 102 which has been rotated with an angle. Being reflected down by the head mirror 102, the incident light is further reflected upwards by the parabolic reflecting mirror 104 and further downwards by the wide-narrow field-of-view aspherical reflecting mirror 106 twice. The incident light 100 projects to the reticle 108 after being reflected by the wide-narrow field-of-view aspherical reflecting mirror 106, and then travels through the following derotator 110 to prevent the image from rolling due to yaw motion of the turret. Via multiple beam splitters 112, 114, 116 and multiple lens sets 118 and 120, the incident light is decomposed into several light beams in various wavelength bands (image output).

The above "common-optical-path periscope" makes the light beams in different wavelength bands parallel to each other after traveling through the derotator 110 instead of having the light beams in different wavelength bands traveling along different optical paths. Thus, the common-optical-path periscope reduces the complexity of arrangement of the beam splitters 112, 114, 116 and the lens sets 118, 120. Thus, the field-of-view switching and focusing driving structure of the common-optical-path periscope provided by the invention is a modification of the above wide-narrow field-of-view aspherical reflecting mirror 106.

Figure 2:
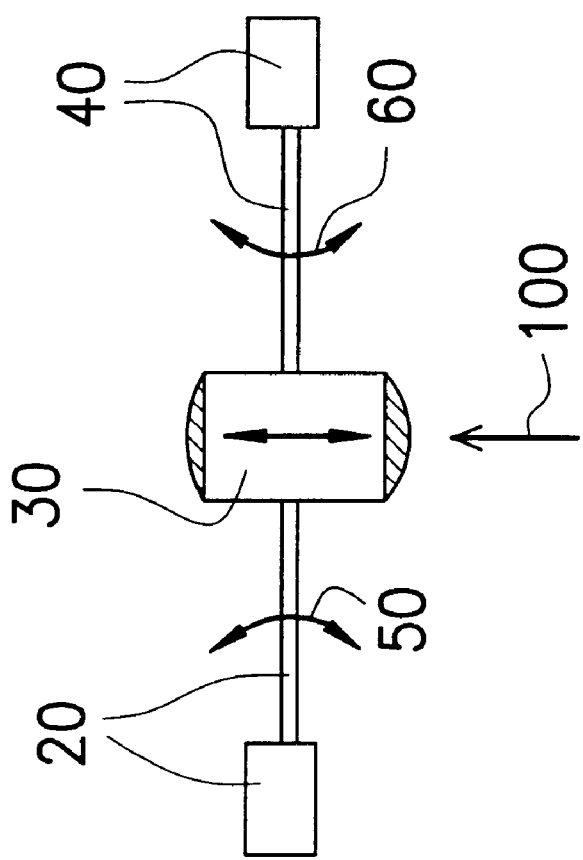
FIG. 2 shows the schematic drawings of the field-of-view driving system and the focus driving system of the common-optical-path periscope according to the invention.

FIG. 2 shows an embodiment of a field-of-view switching and focusing system for a common-optical-path periscope according to the invention. The field-of-view switching and focusing system of the common-optical-path periscope includes an aspherical reflecting mirror system 30, a field-of-view driving system 20 and a focus driving system 40. The field-of-view driving system 20 and the focus driving system 40 are located at two sides of the aspherical reflecting mirror system 30. The field-of-view driving system 20 allows the aspherical reflecting mirror system 30 to rotate along the direction 50, so that different curved faces of the aspherical reflecting mirror reflect the incident light 100 to achieve the objective of switching the field of view. The focus driving system 40 allows the aspherical reflecting mirror system 30 to perform a fine adjustment of the focus according to the fine adjustment direction 60 by moving back-and-forth along a direction parallel to the incident light 100.

Figure 3:
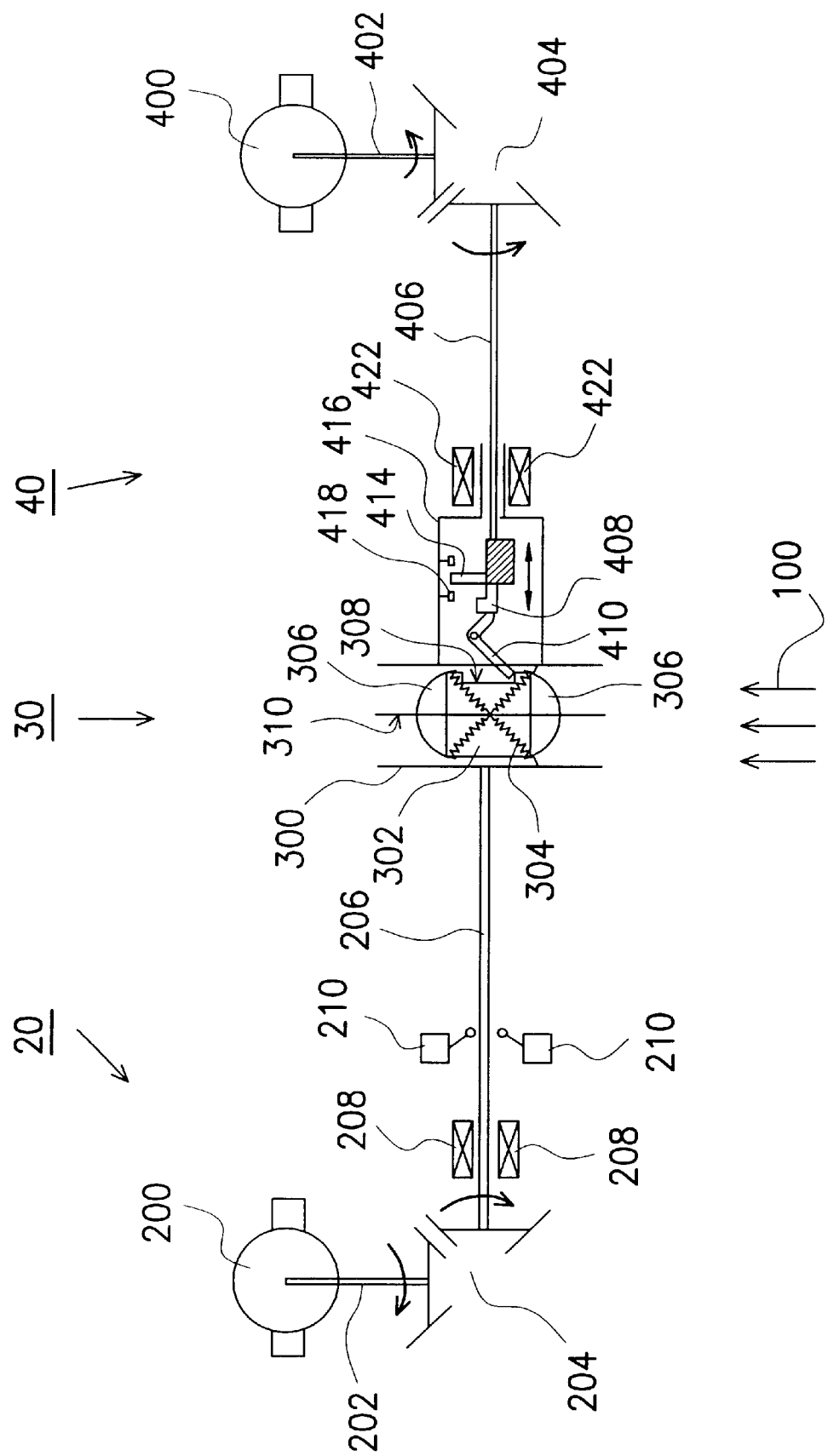
FIG. 3 shows the detailed structures of the field-of-view driving system and the focus driving system of the common-optical-path periscope according to the invention.

Referring to FIG. 3, a detailed structure of the field-of-view switching and focusing system of the common-optical-path periscope is shown. The detailed structure of the field-of-view driving system 20, the aspherical reflecting mirror system 30 and the focus driving system 40 is introduced.

The aspherical reflecting mirror system 30 has a mirror base 300, a mirror frame 302, multiple resilient members 304 and aspherical mirror 306. The mirror frame 302 is installed in the mirror base 300 by means of the resilient members 304, for example. The resilient members 304 include springs, for example. Multiple aspherical reflecting mirrors 306 are mounted on the mirror frame 302. The amount of the aspherical reflecting mirrors 306 is 2, for example, and the aspherical reflecting mirrors 306 are disposed on the mirror frame 304 back-to-back. In addition, the mirror frame 302 has a recess near the position where the focus driving system 40 is installed. Being installed in the mirror base 300 by the resilient members 304, the mirror frame 302 moves linearly back-and-forth along the internal axis 310 of the mirror base in the fine adjustment direction 60 under the influence of an external force. The above internal axis 310 of the mirror base is parallel to the optical path of the incident light 100.

The field-of-view driving system 20 is installed at one side of the aspherical reflecting mirror system 30. The field-of-view system 20 comprises a field-of-view driving motor 200, a first shaft 202, a worm gear 204, and a second shaft 206. The first shaft 202 is driven to rotate by the field-of-view driving motor 200, while the worm gear 204 is driven by the first shaft 202 to rotate. The worm gear 204 then drives the second shaft 206 to rotate. The second shaft 206 is connected to the mirror base 300 of the aspherical reflecting mirror system 30, so that the mirror base 300 is driven to rotate thereby. In addition, the field-of-view driving system 20 further comprises a first bearing 208 and a first limit switch 210. The first bearing 208 is fitted to the second shaft 206, for example, and the first limit switch 210 is used to control on/off state of the field-of-view driving motor 200, and to further precisely control the rotation thereof.

The field-of-view driving system 20 is applicable to rotate the aspherical reflecting mirror system 30, so that one of the aspherical reflecting mirrors 306 thereof is facing the incident light 100. As the field-of-view driving system 20 drives the aspherical reflecting mirror system 30, different aspherical reflecting mirrors 306 can face the incident light 100, so that the field of view can be switched.

The typical dual field of views normally rotates the second shaft 206 with an angle of 0° or 180°. For example, the second shaft 206 rotates 0° represents the mechanical position for wide field of view (WVOF), while the second shaft 206 rotates 180 represents the mechanical position for the narrow field of view (NVOF). In addition, when the shaft 206 rotates from 0° to 180° or from 180° to 0°, the first limit switch 210 turns off the driving motor 200. Thus, by adjusting the position of the first limit switch 210, the rotating angle of the aspherical reflecting mirror system 30 is precisely controlled.

The focus driving system 40 is installed at the other side of the aspherical reflecting mirror system 30. The focus driving system 40 comprises a focus driving motor 400, a third shaft 402, a worm gear 404, a lead screw 406, a slide 408, a limit pin 414, and a taper cam 410. The third shaft 402 is driven by the focus driving motor 400 to rotate, and the worm gear 404 is driven by the third shaft 402 to rotate. The lead screw 406 is driven by the worm gear 404 to rotate, and the slide 408 moves linearly for being driven by the lead screw 406. The limit pin 414 is mounted on the slide 408 and move with the slide 408. The taper cam 410 has one end in contact with the slide 408 and the other end in contact with the recess 308 of the mirror frame 302, so that the taper cam 410 is rotated by the linear movement of the slide 408.

The focus driving system 40 further comprises a bushing 416 to enclose the slide 408, the limit pin 414, the taper cam 410, and a part of the lead screw 406 therein. The bushing 416 has one end in contact with the lead screw 406 and the other end in contact with the mirror base 300. A second bearing 422 is installed at the joint of the bushing 416 and the lead screw 406. The bushing 416 further comprises a second limit switch 418 therein to control the on/off state of the focus driving motor 400.

The correlation between the movement of the field-of-view driving system 20, the aspherical reflecting mirror system 30 and the focus driving system 40 is introduced as follows.

The focus driving system 40 according to the movement of the fine adjustment direction 60 drives the movement between the taper cam 410 and the recess 308 so the aspherical reflecting mirror system 30 can move back-and-forth along a direction of an incident light 100 (that is the internal axis 310 of the mirror base) to perform fine focusing.

According to the above, the field-of-view switching and focusing structure of the common-optical-path periscope of the invention has at least the follow advantages:

1. The field-of-view switching structure of the common-optical-path periscope can perform accurate switching of both wide field of view and narrow field of view.
2. The focus driving structure of the common-optical-path periscope can perform a precise focusing on both wide field of view and narrow field of view.
3. In the field-of-view switching and focusing structure of the common-optical-path periscope, the field-of-view driving structure and the focus driving structure are coaxially installed on two sides of the aspherical reflecting mirror system coaxially, so that the volume occupied thereby is reduced a lot, and the problem of space limitation is overcome.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A field-of-view switching and focusing system of a common-optical-path periscope, applicable to switch field of view and focus an incident light, comprising:
   an aspherical reflecting mirror system, having a mirror base, a mirror frame, a plurality of resilient members and a plurality of aspherical reflecting mirrors, wherein the aspherical reflecting mirrors are installed on the mirror frame, and the resilient members are used to fix the mirror frame in the mirror base;
   a field-of-view driving system, installed at one side of the aspherical reflecting mirror system to rotate the mirror base, so as to have one of the aspherical reflecting mirrors facing the incident light; and
   a focus driving system, installed at the other side of the aspherical reflecting mirror system, wherein the focus driving system moves linearly back-and-forth along a first direction that is parallel to the incident light.

2. The field-of-view switching and focusing system according to claim 1, wherein the resilient members include springs.

3. The field-of-view switching and focusing system according to claim 1, wherein the field-of-view driving system further comprises:
   a field-of-view driving motor;
   a first shaft, driven by the field-of-view driving motor to rotate;
   a worm gear, driven by the first shaft to rotate; and
   a second shaft, driven by the worm gear to rotate, wherein the second shaft is connected to the mirror base to drive the mirror base.

4. The field-of-view switching and focusing system according to claim 3, wherein the field-of-view driving system further comprises a first bearing fitted on the second shaft.

5. The field-of-view switching and focusing system according to claim 1, wherein the field-of-view driving system further comprises a first limit switch to control on/off state of the field-of-view driving motor.

6. The field-of-view switching and focusing system according to claim 1, wherein the focus driving system further comprises:
   a focus driving motor;
   a third shaft, driven by the focus driving motor to rotate;
   a worm gear, driven by the third shaft to rotate;
   a lead screw, driven by the worm gear to rotate;
   a slide, driven by the lead screw to move linearly;
   a limit pin, installed on the slide to move with the slide; and
   a taper cam, having a first end and a second end, wherein the first end is in contact with the slide and the second end is in contact with the mirror frame, and the taper cam is rotated by linear movement of the slide.

7. The field-of-view switching and focusing system according to claim 6, wherein the mirror frame has a recess in contact with the second end.

8. The field-of-view switching and focusing system according to claim 6, wherein the focus driving system further comprises a bushing enclosing the slide, the taper cam, and a part of the lead screw therein.

9. The field-of-view switching and focusing system according to claim 8, wherein the bushing has one end coupled to the lead screw and the other end coupled to the mirror base.

10. The field-of-view switching and focusing system according to claim 8, wherein the bushing further comprises a second limit switch combined with the limit pin to control on/off state of the focus driving motor.

11. The field-of-view switching and focusing system according to claim 8, wherein the focus driving system further comprises a second bearing fitted to a joint of the shaft and the lead screw.

* * * * *